UNITED STATES PATENT OFFICE.

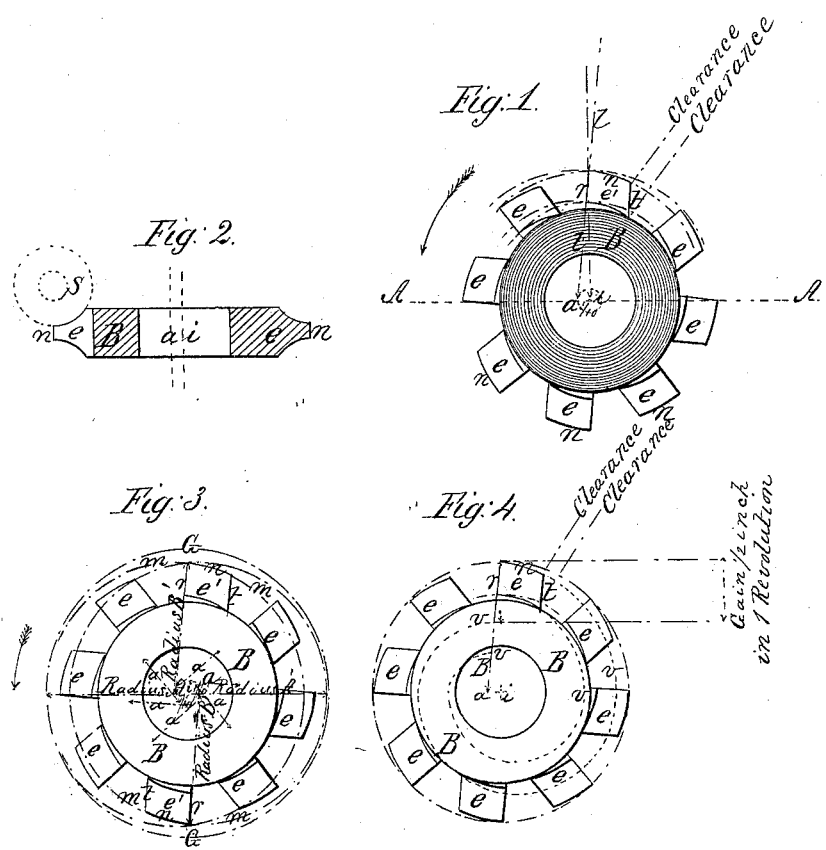

JOSEPH R. BROWN, OF PROVIDENCE, RHODE ISLAND, ASSIGNOR TO HIMSELF AND LUCIEN SHARPE, OF SAME PLACE.

IMPROVED CUTTER FOR CUTTING GEAR-WHEELS.

Specification forming part of Letters Patent No. 45,294, dated November 29, 1864.

*To all whom it may concern:*

Be it known that I, JOSEPH R. BROWN, of Providence, in the county of Providence and State of Rhode Island, have invented a new and Improved Cutter for Cutting the Teeth of Gear-Wheels, &c.; and I do hereby declare that the following is a full, clear, and exact description of the same, reference being had to the accompanying drawings, making part of specification, in which—

Figure 1 is a circumferential view of my improved cutter. Fig. 2 is a cross-section of the same through the line A A of Fig. 1. Figs. 3 and 4 are diagrams which illustrate the theory of construction of my improved cutter.

Similar letters of reference indicate corresponding parts in all the figures.

My invention relates to an improvement in the teeth or cutting-blades of the rotary cutter which is generally used for cutting the teeth of gears, and is calculated to remedy an important difficulty that I will mention. Ordinarily the teeth or blades of the cutter are filed up to a cutting-edge in quite an imperfect manner, and as the requisite clearance in such teeth or blades is considerable any subsequent sharpening of the teeth reduces their cutting-contour so materially as to alter both the size and form of the teeth which they are intended to cut, and thus renders the cutter useless.

My improvement, to overcome this difficulty, consists in constructing the teeth or blades in the form of segments or curvilinear sections that are mechanically accurate in outline, and of equal size and contour throughout their entire length, each of which has a sufficient circumferential inclination with respect to the revolving circumference of the cutter to produce the proper degree of clearance, so that the tooth may be sharpened by grinding away its face until the strength of the tooth is permanently impaired, and always present the same cutting-contour, each new face and cutting-edge produced by grinding being a fresh radial section of an equiform tooth throughout its whole length.

To enable others skilled in the art to make and use my invention, I will proceed to describe the same.

In the drawings, B is the hub of the cutter, and $e'$ $e$ $e$ $e$ $e$ $e$ $e$ are the teeth or cutting-blades, which are more or less in number, according to the size of the cutter; and it will be seen that each tooth or blade like $e'$ is in the form of a segment or curvilinear section, of which the dotted red line $l$, Fig. 1, is the radius and the point $a$ is the center or axis; and supposing that the tooth $e'$ is of equal size and form throughout its entire length from the cutting edge or face $r$ to the rear end or face, $t$, as will be presently shown, it will be seen that by removing the center $a$ of the segmental tooth aside from the axis $i$ of the cutter to the extent, say, of one-tenth of an inch, a sufficient circumferential inclination is given to the tooth to produce the degree of clearance shown at the rear end, $t$, around the whole contour of the same.

The contour of the tooth is exhibited by the cross-section, Fig. 2, and is produced by a rotary cutter, S, (in dotted lines,) of the proper diameter, operating upon one side at a time of each tooth successively, while the cutter-blank B is turned with a slow feeding motion upon the axis or center $a$. This operation may be performed with great facility by a machine especially adapted to the purpose; but it may also be readily performed with an ordinary gear-cutting machine in the following manner:

The steel cutter-blank B is mounted upon the spindle of the index-plate, and by means of a suitable cutter its edge roughly cut into divisions, to be subsequently wrought into the teeth $e$ $e$, &c. The blank B is then set aside from its axis $i$ about one-tenth of an inch, so that its center or axis will temporarily be, as at $a$, Fig. 1, with the revolving-cutter in line with the radius $l$, which, being fed up to the blank B, cuts the radial faces $r$ and $t$ of each tooth successively, and by turning the blank with a slow feeding motion from one face, $r$, to the other, $t$, by means of a suitable facing-cutter the curved periphery $n$ of the segmental tooth is produced. These surfaces $n$ of the teeth $e$ $e$, &c., being wrought, the cutter S, Fig. 2, is placed in the machine and made to operate upon the sides of teeth while the blank is slowly turned on its axis $a$, in the manner above explained, dressing or shaping the teeth upon the upper side successively, after which the blank is turned over and the other side of the teeth operated on in like manner, the blank being necessarily turned in the opposite direction to cut from the cutting-face to the rear end,

*t*. The cutter is then finished and is ready for tempering.

Geometrically referring to diagram, Fig. 3, the segmental teeth $e'$ $e$, &c., coincide in their outline with the generating circle $m$ of an epicycloidal curve of which G G is the fundamental circle, the radii B being those of the generating circle, and the radii A' being those of the fundamental circle, the curvature of each tooth being described from a center of its own, as indicated by the radial arrows $a$.

Another and a better curvilinear outline of tooth or blade is exhibited in the diagram, Fig. 4, in which the tooth is a section of a scroll or an epicycloidal curve, (represented by the dotted lines $v$ $v$,) having a radial gain of, say, one-half an inch in the circumference of the cutter, which gives a greater circumferential inclination, and consequently a more acute cutting-angle and larger clearance to the same length of tooth than is obtained by the curvature of the generating circle $m$, Fig. 3. The gain of the scroll-curvature is also susceptible of greater variation than that of the generating circle to adapt the outline of the teeth to different diameters of cutter, and teeth of this outline or curvature with less complication of machinery than those represented in Fig. 3.

The scroll or epicycloidal teeth $e$, Fig. 4, may be constructed on a gear-cutting machine by advancing the cutter S, Fig. 2, say, three one-thousandths of an inch radially to each one two-hundredths of a revolution of the cutter-blank.

By the methods above described the teeth of cutters may be made of the same size and contour from their cutting-face to the rear end with mechanical accuracy, so that any radial section of the tooth will present but one size and contour.

Having described my invention, what I claim, and desire to secure by Letters Patent, is—

A cutter for cutting the teeth of gears, composed of a series of cutting blades or teeth constructed substantially as described.

JOS. R. BROWN.

Witnesses:
ISAAC A. BROWNELL,
CHAS. H. WILLCOX.